Patented Mar. 3, 1953

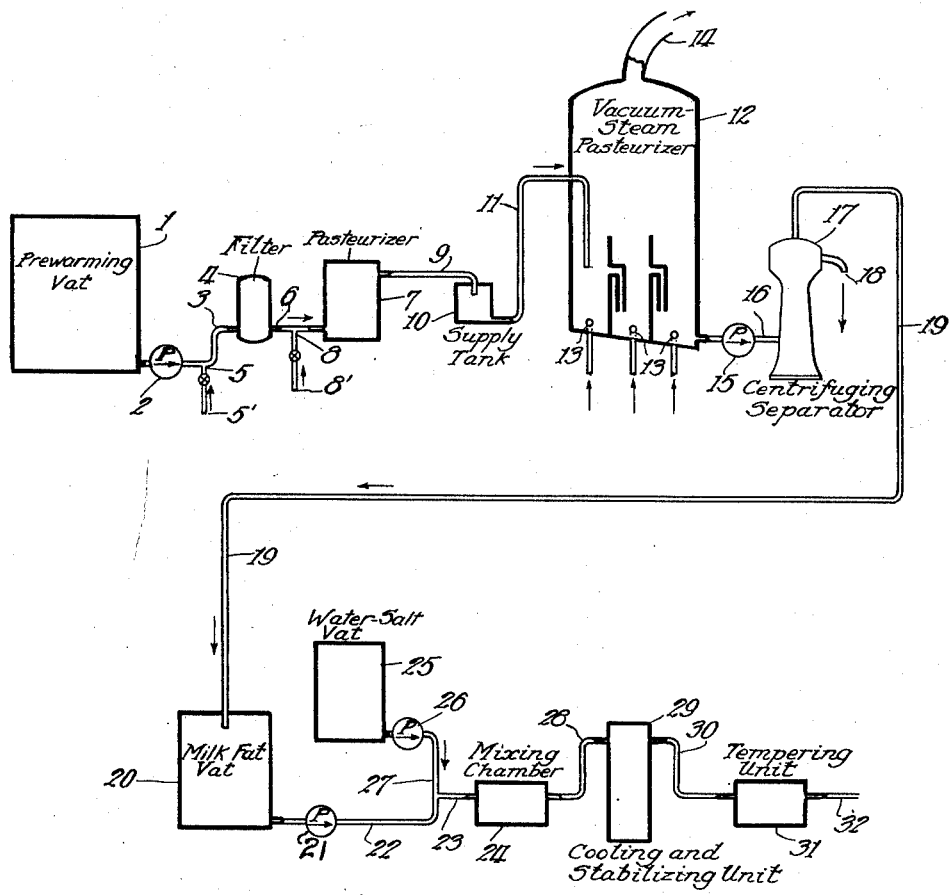

2,630,388

UNITED STATES PATENT OFFICE 2,630,388

BUTTER

Herman C. Horneman, Danville, Ralph V. Hussong, Urbana, and Sidney N. Quam, Danville, Ill., and Bernard W. Hammer, Sarasota, Fla., assignors, by direct and mesne assignments, to Cherry-Burrell Corporation, Chicago, Ill., a corporation of Delaware Original application December 6, 1940, Serial No. 368,750. Divided and this application April 12, 1947, Serial No. 741,088

12 Claims. (Cl. 99—119)

The present invention relates to an improved butter product and the process for producing milk fat concentrate and butter. In particular, the invention relates to the improved butter product.

Prior processes used in the commercial manufacture of butter are, generally speaking, in essence the same and are commonly known as "batch" processes. Such batch processes generally employ a churn for churning cream having a butter fat content of approximately thirty percent (30%) in the production of butter and buttermilk. With the exception of the preliminary cream treatments and with the exception of minor mechanical or apparatus changes, there has not been an important or revolutionary improvement in methods adapted for the commercial manufacture of butter, for many years.

This application is a division of our parent application Serial No. 368,750, filed December 6, 1940, and entitled "Butter Process," now Patent No. 2,423,834.

In the art of manufacturing butter, it has long been recognized that a need existed for improvements in processes for producing butter. Prior investigators have suggested various modifications of such old processes. Such suggested modifications have, however, generally failed. One of such suggested modifications proposed the use of a process for producing butter from a plastic or super-cream, containing in the neighborhood of sixty-five percent (65%) milk fat. That particular modification of the old processes of manufacturing butter, likeunto other modifications, included a modification contemplating the use of a converter or agitating means for the reversal of the phase of the milk fat in the cream, i. e., changing the dispersed phase of the milk fat, which is present in the cream, to a continuous phase. Modifications of the mentioned type in the accepted processes for the manufacture of butter which call for the reversal of the phase of the milk fat in a high fat cream product have not been found to be satisfactory, and as a result have not proved successful up to the present time.

It is an object of the present invention to provide an improved process for producing milk fat concentrate.

It is also an object of the present invention to provide an improved process for producing butter.

It is a further object of the present invention to provide a continuous process for the production of butter having improved qualities and characteristics.

It is still a further object of the present invention to provide commercially satisfactory processes for producing milk fat concentrate and butter free from the common objectionable characteristics and aspects associated with butter made by prior usable butter manufacturing processes.

Other objects and advantages of the present invention will be more apparent as the following description is considered.

We have discovered commercially satisfactory processes for producing milk fat concentrate and butter having the generally desired physical and chemical characteristics and aspects. The improved processes, in general, include the steps of introducing cream into a zone or chamber wherein the cream is subjected to subatmospheric pressure and wherein the cream is subjected to the direct action of steam while under such a reduced pressure, concentration of the milk fat in the cream being processed by subjection of the cream, while at a temperature above the melting point of the milk fat content thereof, to a centrifuging action, separation of the concentrated milk fat, which has been thus obtained and in which the fat portion thereof is in the continuous phase, from other constituents of the cream, and thereafter working said concentrated milk fat product to produce butter having the desired physical and chemical characteristics and aspects. The cream used in the above process may or may not, as appears desirable, be pre-treated, although the use of a high quality pasteurized cream is generally preferred.

For a more complete understanding of the nature and scope of the invention, reference may be made to the following detailed description thereof, to be read in connection with and with reference to the accompanying drawing, wherein the single figure is a flow sheet diagrammatically illustrating steps or sequences of operations contemplated by this invention.

As illustrated in the drawing, cream having a milk fat concentration of approximately 30 percent to 40 percent is warmed in a prewarming vat 1 to a temperature of approximately 90° F. to 110° F. In the event that neutralization of the cream to be used in the process is desired, the neutralization may be carried out, for example, in the prewarming vat 1, in accordance with the general practice commonly followed in the buttermaking art.) From the vat 1, the cream is pumped by pump 2 through conduit 3 into and through filter 4. Steam under a pressure of approximately 90 to 100 pounds per square inch is introduced into the conduit 3 at station 5 from a steam supply line 5'. The mixture of the cream and steam in the conduit 3 raises the temperature of the cream sufficiently so that the cream enters the filter 4 at a temperature of approximately 135° F. From the filter 4, cream flows through conduit 6 into a flash pasteurizer 7, which may, for example, be of the well recognized and commonly known "Jensen" type. Steam is also introduced into a conduit 8 at station 8 from the steam supply line 8'. The mixture of the filtered cream with the steam in the conduit 8 raises the temperature of the cream sufficiently so that the cream enters the bottom of the pasteurizer from the conduit 8 at a temperature of approximately 150° F. to 160° F. The cream under generally accepted operating conditions remains in the pasteurizer 7 for a period of time of approximately 10 to 15 seconds, during which period of time the cream being pasteurized is heated to a temperature of approximately 190° F. to 194° F. Such additional heating of the cream in the pasteurizer 7 may be accomplished, for example, by the use of steam for indirectly heating the cream in the manner common in the art of the well-known "Jensen" type of pasteurizer. The pasteurized cream flows from the pasteurizer 7 through conduit 9 to a supply tank 10, from which, in turn, it flows through conduit 11 to a zone of sub-atmospheric or reduced pressure for vacuum-stream treatment.

The cream having a temperature of approximately 175° F. to 190° F. is drawn through the conduit 11 into the vacuum pasteurizer 12, in which exists the zone of sub-atmospheric or reduced pressure and which vacuum pasteurizer may, if desired, be of the type described in more detail in the United States Patent No. 2,022,420. The pressure existing within the vacuum pasteurizer or chamber 12 is of a subatmospheric or reduced nature and preferably is maintained at a reduced pressure of approximately 25 to 26 inches of mercury, as a result of which the maximum temperature within the chamber 12 will be approximately 130° F. to 135° F. Steam under a pressure of approximately 90 pounds per square inch is introduced into the bottom of the vacuum pasteurizer or chamber 12 through the steam pipes 13, as illustrated in the drawing, whereby the steam comes into direct contact with the cream within the chamber 12 while the cream is under a reduced or subatmospheric pressure. The desired and preferred pressures and temperatures are readily maintained in the chamber 12 by withdrawing vapor or volatile gases containing objectionable flavoring materials through the passage 14 by means of any conventional apparatus, such as a vacuum pump (not shown).

The treated cream, which has suffered practically no net loss or gain in its moisture content, content, collects in the lower portion of the chamber 12, from which it is drawn by pump 15 and forced through conduit 16 to the centrifuging separator 17. The cream within the separator 17 is in general terminology of a temperature of approximately 125° F., and in each instance should be at a temperature at least above the melting point of the various types of milk fats present in the cream being separated.

In the separator 17 substantially all of the milk fat is separated from the proteins, skim milk, etc., and is discharged therefrom in a mixture in which the milk fat portion thereof is in the continuous phase and in a liquid form. The mixture containing the milk fat is expelled from the separator at the station 18 and contains approximately 80 percent to 98 percent milk fat, depending upon the extent of the above-mentioned centrifuging action. The major portion of such milk fat is in the continuous phase, and is next passed from station 18 through conduit 19 to the vat 20. From the vat 20 the milk fat product, with the milk fat still in a liquid state and in the continuous phase, is pumped by pump 21 through the conduits 22 and 23 to the mixing chamber 24. A controlled aqueous solution of salt, starter flavors, etc., may be pumped from the vat 25 by the pump 26 through the conduits 27 and 28 into the mixing chamber 24, wherein such aqueous solution may then be mixed with the fat product supplied to the chamber 24 from the vat 20. The resulting mixture, containing at least 80 percent milk fat, is then conducted from the mixing chamber 24 through conduit 28 to a cooling and stabilizing unit 29, wherein the temperature of the mixture is reduced to a temperature of approximately 40° F. to 60° F. The cooled and stabilized mixture is conducted from the cooler and stabilizer 29 through the conduit 30 into the tempering unit 31, wherein the desired texture is imparted or developed in the butter thus produced. The tempered product is forced from the tempering unit 31 and conducted through the conduit 32 to a suitable packaging machine (not shown).

It will be understood that the above representative detailed description of the preferred method of practicing the improved process is merely illustrative and that the present invention is not limited thereto. The pre-treatments, including filtering and pasteurizing the cream, may be modified or eliminated in whole or in part, as desired. Pasteurization of the cream, for example, may be performed entirely by mixing steam and cream. The working of the milk fat mixture after it is discharged from the separator, including mixing the mixture with water and with salt or with brine if salted butter is desired, etc., as well as the cooling and tempering, commonly referred to in the art of buttermaking as aging, may also be modified if desired. Optimum conditions which may vary with the particular type of milk fat present in the cream, which in turn varies with the seasons of the year and the respective localities from which the cream is secured and the feed which has been consumed by the cows from which the milk is secured, may readily be determined by conducting conventional types of tests, comonly practiced in the art of butter manufacture.

The temperatures and pressures in the vacuum pasteurizer 12 and in the separator 17, referred to in the preceding detailed description of the improved process, of necessity represent one set of preferred conditions for the practice of the improved process. The mentioned illustrative temperatures and pressures, however, may also be modified as desired and necessary and optimum conditions, including the necessary time of treatment within the vacuum pasteurizer (e. g. 5 to 30 minutes), should be varied on the basis of the particular type of cream undergoing treatment.

The change in the cream during the vacuum-steam treatment is not fully understood. Our investigations indicate that subjecting the cream to sub-atmospheric pressure produced an expansion of the cream, and that the action of the steam (e. g. steam under a high pressure of 90 to 100 pounds per square inch immediately ahead of the steam nozzle), coming into direct contact with the cream which is in the expanded state, modifies the milk fat globules so that they separate into the continuous phase when later subjected to the centrifuging action in the separator. Our investigations also indicate that the best results are obtained when the cream entering the zone of sub-atmospheric pressure is preheated to a temperature greater than the temperature of saturated steam at a reduced or sub-atmospheric pressure within the mentioned zone. The fact that the fat is obtained in the continuous phase indicates that the complex protein-fat-hull or membrane surrounding the milk fat globule is modified physically or chemically or both by the combined vacuum and steam treatment in chamber 12. It will be understood, however, that the present invention is not limited by theoretical explanations.

The addition of a controlled amount of water to the concentrated milk fat enables the securing of a more uniform or finer dispersion of water in a water-in-fat emulsion, resulting in an improved texture in the butter made from such emulsion. The amount of water added varies with the percentage of milk fat in the concentrated milk fat emulsion, which concentrated milk fat emulsion preferably contains 85 percent to 95 percent fat. The amount of water thus added to the milk fat emulsion is controlled so that the final butter product contains at least 80 percent milk fat.

The aspect of the present invention pertaining to the fine dispersion of water or brine in the milk fat emulsion and the low protein content of the emulsion, as well as the removal of substantially all of the original water and water soluble materials from the milk fat which is to be used for the manufacture of butter, enables the advantageous use of the invention in the production of a stable butter. A substantial proportion of nitrogenous material—one of the bacterial foods in butter—is separated from the milk fat in the centrifugal separator.

As previously mentioned, the raw milk or cream as contemplated by this invention contains only approximately 35 percent milk fat. The advantages obtained by replacing the original non-fat materials of the cream with controlled water starter mixtures free from undesired contamination will be obvious to those skilled in the art. An additional advantage of the present invention resides in the elimination of "churning" commonly carried out today, for the most part, in bacteria-contaminated wooden churns.

It would be obvious to those skilled in the art that the milk fat concentrate of the present invention is particularly adaptable for use as an intermediate in the preparation or manufacture of butter, in which the quality and composition of the concentrate may be accurately controlled.

It will also be obvious to those skilled in the art that the mentioned milk fat concentrate is also adaptable for use in the manufacture of cheese, ice cream, frozen desserts, confections, baked goods and the like.

It will be understood that the present invention is not limited to the illustrative process herein described. All modifications coming within the scope of the present invention are intended to be covered in the appended claims.

In the specifications and claims, the term "starter" refers to starter cultures. Such cultures are well known in the art of buttermaking and serve as means for flavoring the manufactured butter. In the specifications and claims, the term "cream" is used with the thought that it is to be given the ordinary or conventional meaning and is used to identify a product in which the milk fat is in the dispersed phase, i. e., the milk fat dispersed as an emulsion in a continuous phase of non-fat milk liquids. Cream products differ materially from the concentrated fat or "fat concentrate" of the present invention, in which "fat concentrate" the milk fat is present in the continuous phase.

The invention is hereby claimed as follows:

1. An oleaginous product containing milk serum solids and water and butterfat which is derived directly in the continuous phase from cream, said oleaginous product being characterized by the fact that in its production the liquid mixture containing butterfat in the continuous phase is subjected to cooling and simultaneous stabilization, whereby to produce an oleaginous product having a close texture.

2. Butter capable of maintaining its basic structure and crystalline form at room temperatures, which comprises a uniformly dispersed mixture of butterfat in the continuous phase and water and salt and milk serum solids, which mixture has been subjected to cooling and simultaneous stabilization and thereafter subjected to relatively quiescent resting while under super-atmospheric pressure for the period during which the major portion of the crystallization of the fat occurred.

3. A close textured butter adapted to maintain its basic structure and crystalline form at room temperatures, comprising a mixture having at least 75 per cent butterfat extracted directly in the continuous phase from cream and mixed and thereafter cooled and simultaneously stabilized with the remainder of the mixture having from 5 percent to 25 percent standardizing material taken from a group consisting of water and milk serum solids and salt.

4. Butter, comprising a mixture of water and milk serum solids and butterfat in the continuous phase derived directly in liquid form from cream by destabilizing the cream and separating the liquid butterfat therefrom, said mixture when converted into butter having the consistency obtained by cooling and simultaneously stabilizing the mixture under a super-atmospheric pressure for a period of time sufficient to crystallize a substantial portion of the fat crystallizable at room temperatures.

5. Butter, according to claim 4, wherein the cooled and agitated butter while under confined flow conditions is subjected to a tempering operation, whereby to produce the desired texture in the finished butter product.

6. A product made from butter oil and having as compared with butter a closer structure and relatively increased ability to maintain its basic crystalline structure and form at room temperatures, the product being produced by destabilizing a dairy product containing milk fat in the dispersed phase, separating from the destabilizing dairy product a fraction containing a high concentration of liquid milk fat in the continuous phase, and subjecting the said separation fraction to simultaneous stabilizing and cooling to produce a butter product having a close texture.

7. A butter product, including an oleaginous medium consisting primarily of butterfat having dispersed therein a quantity of water equivalent to from one percent to eighteen percent by weight of said medium, a quantity of milk serum solids equivalent to from one-fourth percent to five percent by weight of said medium, a quantity of salt equivalent to from one-fourth percent to five percent by weight of said medium, said butter when prepared being subjected to cooling and simultaneous stabilizing to convert a substantial portion of said liquid milk fat into minute crystals.

8. A new butter product, comprising a close textured butter formed from butter oil in the continuous phase derived directly from a destabilized dairy product containing butter oil in the dispersed phase and standardizing ingredients taken from a group consisting of water and salt and milk serum solids, said standardizing ingredients being dispersed in an aqueous medium prior to dispersion in the oleaginous medium, said standardizing materials being of such fine and uniform dispersion in said butter that substantially all of the water in said butter contains salt.

9. Butter made from a mixture including an oleaginous medium, comprising approximately 80 pounds of butter oil derived directly in the continuous phase from cream, about 17 pounds of water, about 1½ pounds of milk serum solids and 1½ pounds of salt, said butter being formed by subjecting the mixture to cooling and simultaneous stabilizing sufficient to convert the major portion of the fat content of said mixture into crystallized form.

10. As a new product, butter containing butterfat derived in the continuous phase directly from cream wherein the butterfat content was in the dispersed phase, said butter being made from a mixture consisting essentially of 75 percent to 95 percent butterfat with the remainder taken from a group consisting of water and salt and milk serum solids and wherein the mixture has been subjected to a stabilizing operation and sudden chilling sufficient to produce a degree of dispersion of the ingredients of the product and to so control the size of the crystals of the butterfat as to produce butter capable of maintaining its basic structure and form at room temperatures.

11. Butter made by a process which includes the steps of destabilizing a dairy product containing milk fat in the dispersed phase, separating liquid milk fat in the continuous phase from the destabilized dairy product, adding to the separation fraction containing the milk fat in the continuous phase a quantity of standardizing solution taken from a group consisting of water and salt and milk serum solids whereby to produce the desired butter composition in the mixture, blending the standardized mixture, subjecting the blended mixture to cooling and simultaneous stabilization to a degree necessary to convert a substantial portion of the milk fat content of the mixture into minute milk fat crystals, and thereafter subjecting the cooled butter to relatively quiescent confined flow for a period of time during which the major portion of the crystallization of the butterfat in the butter occurs.

12. A butter product having a degree of plasticity at room temperature suiting it for culinary operations wherein the ingredients consist essentially of 75 percent to 95 percent liquid butterfat derived in the continuous phase directly from cream and the remaining ingredients are taken from a group consisting of water and salt and milk serum solids, said butter product being prepared by cooling the mixture of butterfat and water and salt and milk serum solids while simultaneously subjecting the mixture to a standardizing operation.

HERMAN C. HORNEMAN.
RALPH V. HUSSONG.
SIDNEY N. QUAM.
BERNARD W. HAMMER.

REFERENCES CITED

The following references are of record in the file of this patent:

UNITED STATES PATENTS

| Number | Name | Date |
|---|---|---|
| 1,791,069 | Wendt | Feb. 3, 1931 |
| 2,150,943 | Sharples | Mar. 21, 1939 |
| 2,423,834 | Horneman et al. | July 15, 1947 |